UNITED STATES PATENT OFFICE.

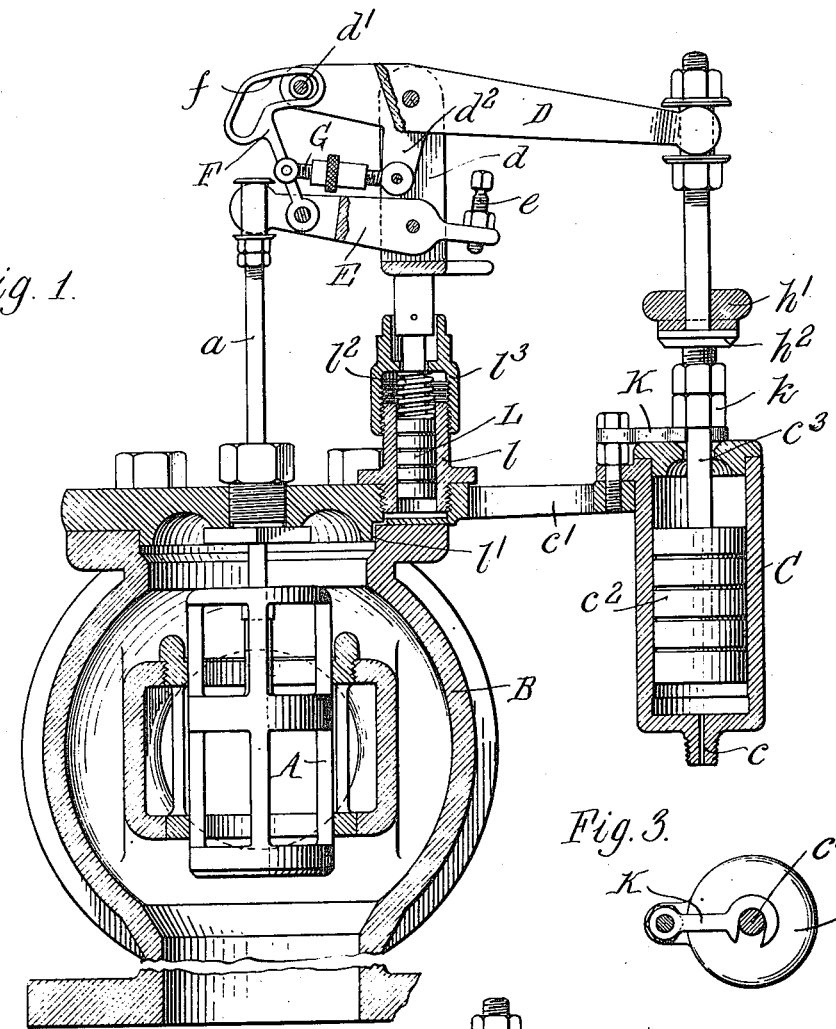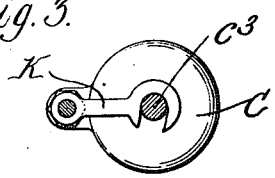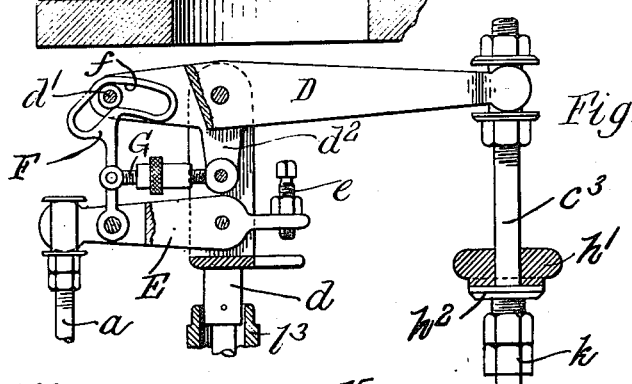

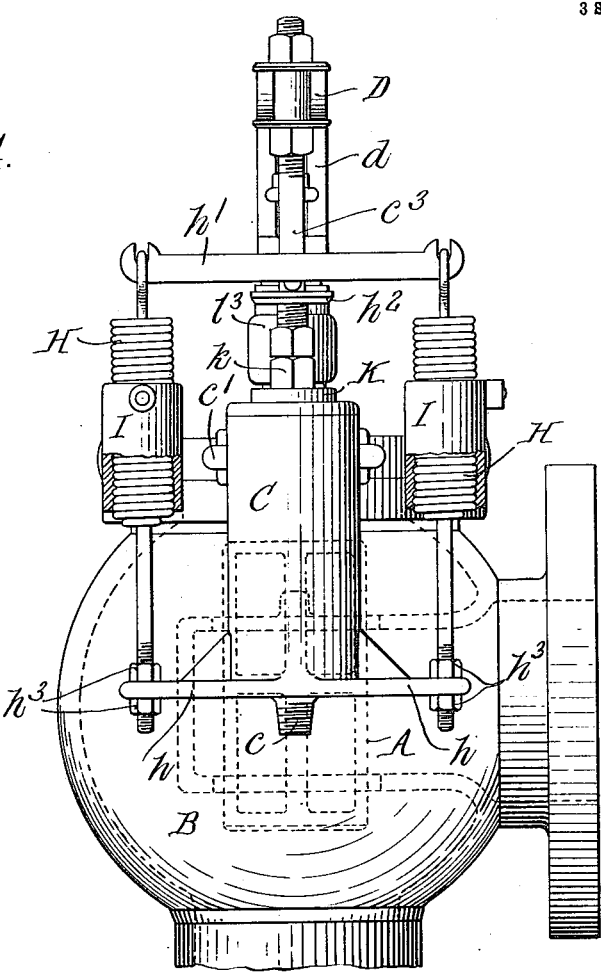
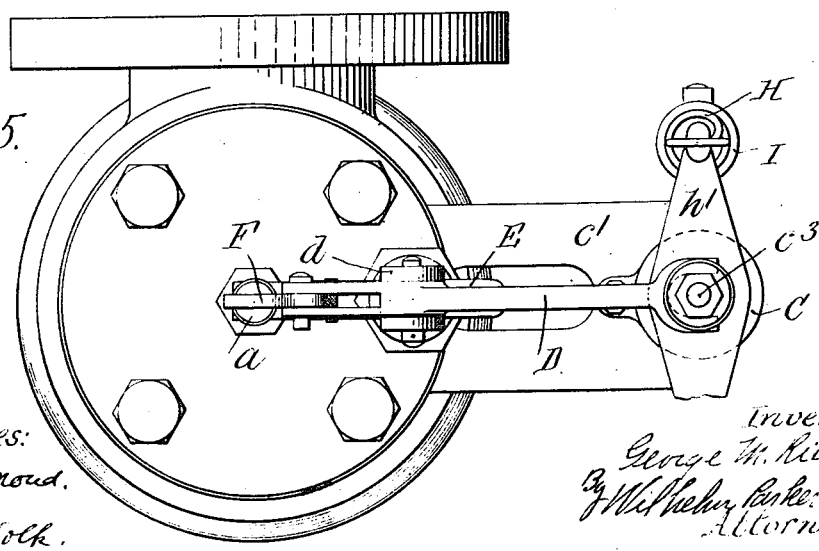

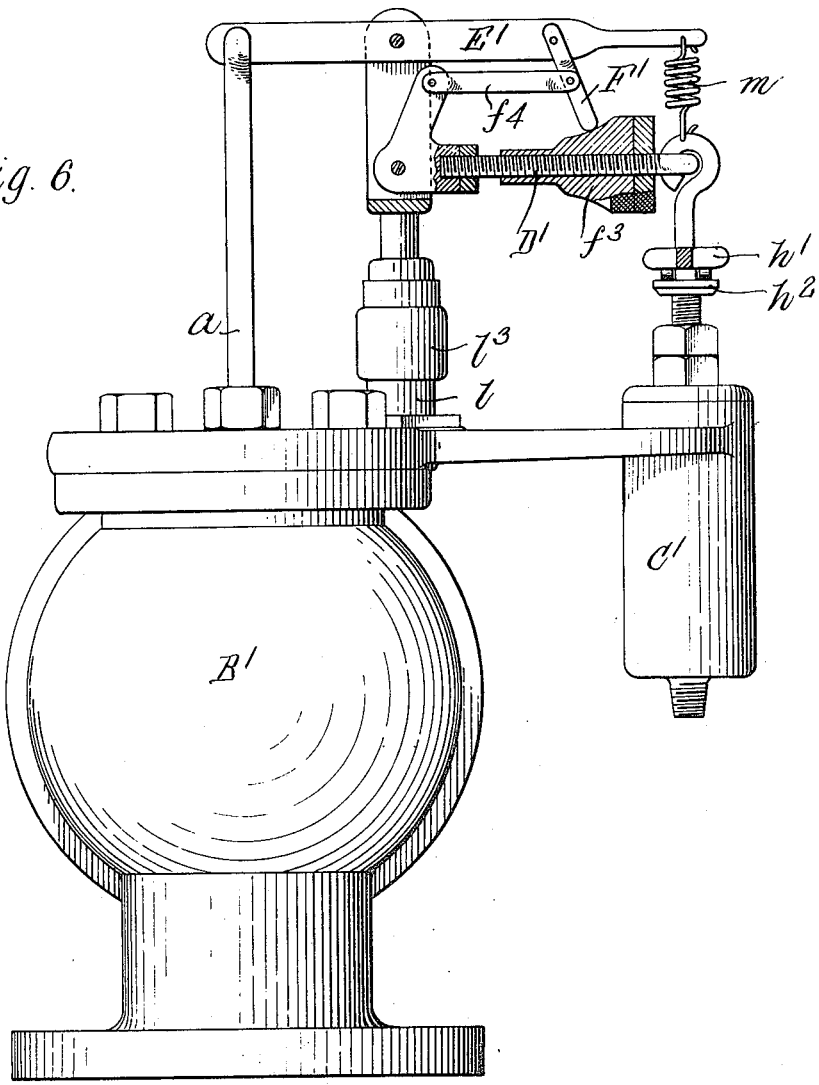

GEORGE M. RICHARDS, OF ERIE, PENNSYLVANIA.

PRESSURE-GOVERNOR.

962,100.

Specification of Letters Patent. Patented June 21, 1910.

Application filed December 18, 1907. Serial No. 407,018.

*To all whom it may concern:*

Be it known that I, GEORGE M. RICHARDS, a citizen of the United States, residing at Erie, in the county of Erie and State of Pennsylvania, have invented a new and useful Improvement in Pressure-Governors, of which the following is a specification.

This invention relates to fluid pressure governors of the type employed for regulating the supply of motive fluid to pumping engines for controlling the speed of the engine as required under the varying conditions of load thereon due to fluctuations in pressure of the pumped fluid, and more particularly to governors which are designed to increase the supply of motive fluid to the engine in proportion as the pressure of the pumped fluid increases up to a predetermined limit to keep the speed of the engine practically constant notwithstanding the increasing load thereon, and to then regulate the motive fluid supply so that the engine will maintain such predetermined pressure without exceeding it, and to also vary the steam supply as required to secure these results regardless of fluctuations in the steam pressure.

The objects of the invention are to produce an efficient and practical governor of this sort in which a single piston or motor moved in one direction by the pumped fluid pressure actuates a valve in opposite directions to increase and decrease the motive fluid supply; to provide the governor with means for regulating the movement of the motive fluid valve with relation to that of the governor motor, so that the valve will govern the motive fluid supply in direct proportion to the fluctuations of load on the engine, and for varying the stroke of the governor piston or motor under a given pressure of the pumped fluid and spring resistance; and also to improve such governors in the other respects hereinafter described and set forth in the claims.

In the accompanying drawings, consisting of three sheets: Figure 1 is a sectional elevation of a fluid pressure governor embodying the invention. Fig. 2 is a fragmentary sectional elevation thereof similar to Fig. 1, but showing a different position of the parts. Fig. 3 is a sectional plan of the normal speed stop device. Fig. 4 is an end elevation of the governor. Fig. 5 is a plan view thereof. Fig. 6 is a sectional elevation of a modified construction.

Like letters of reference refer to like parts in the several figures.

Referring especially to Figs. 1–4, A represents an ordinary balanced valve and B its casing. The valve is located in the supply pipe leading to the pumping engine for controlling the supply thereto of steam or other motive fluid. The governor is especially suited for use with steam engines for driving air compressors, and for the sake of clearness, the motive fluid will be hereinafter referred to as steam, and the pumped fluid as air, although the invention is not restricted to such use. The stem $a$ of the steam valve projects out of the valve casing for connection with the governor motor.

C represents a governor motor to which air is admitted from the receiver or other source supplied by the pump and at a pressure equal to or proportioned to that produced by the pump. The motor shown consists of a cylinder which is provided at its lower end with an inlet connection $c$ for the air and is supported by an arm or bracket $c'$ projecting from the valve casing B, and a piston $c^2$ which is movable in said cylinder and is provided with a rod $c^3$ projecting through the upper end of the cylinder and connected to the steam valve by mechanism preferably constructed as follows: D represents a lever, hereinafter called the governor lever, which is suitably fulcrumed between its ends on a fulcrum post $d$ mounted on the valve casing B. One end of this lever is pivoted, as shown, or in any other suitable manner, to the piston rod of the governor motor, and its other end is preferably forked and provided between the branches of the fork with an anti-friction roller $d'$. An arm $d^2$ projects at an angle from the lever between its ends.

E represents a second lever, hereinafter called the valve lever, which is suitably fulcrumed to the fulcrum post $d$ and is pivoted at one end, as shown, or in any other suitable manner, to the stem of the steam valve. The opposite end of the valve lever is preferably provided with a screw $e$, or other suitable adjustable stop adapted to strike an adjacent projection or part on the fulcrum post to prevent the complete closing of the steam valve, as hereinafter described. F represents a cam or connecting piece, one end of which is suitably pivoted to the valve lever, and the other end of which enters the forked end of the governor lever and is preferably provided with a cam slot $f$ in which the anti-friction roller $d'$ works and which has an end or portion curved concentrically with the pivot of the connecting piece, and another end or portion inclined relative to the curved portion. A link G pivoted at opposite ends to the connecting piece F and to the arm $d^2$ of the governor lever causes said lever and connecting piece to swing together, but in intersecting arcs. The link G consists of two oppositely screw-threaded parts connected by a screw nut, or it is otherwise made adjustable in length for setting the connecting piece in different relations to the governor lever. When the parts of the governor are in the normal or initial position, the roller $d'$ is in the curved portion of the cam slot $f$, as shown in Fig. 1. If the governor piston is raised the roller at the end of the governor lever will descend and, pressing on the connecting piece, will lower the valve lever and open the valve A. The slotted end of the connecting piece will, however, be drawn over toward the fulcrum of the governor lever by the movement of this lever, and when the roller enters the inclined end of the slot, as shown in Fig. 2, if the upward movement of the piston continues, the roller will descend in the inclined end of the slot, while the connecting piece and the valve to which it is connected will be free to rise and will be lifted by the steam pressure on the valve so as to move the valve toward its seat and decrease the supply of steam to the engine. The parts of the mechanism are preferably so proportioned and arranged that the slotted end of the connecting piece will move laterally twice as fast as the roller descends, and the inclined and curved portions of the slot are arranged at such an angle to each other that the connecting piece will rise at the same speed as the roller descends, thus making the motion of the valve toward and from its seat uniform. By adjusting the length of the link G to set the connecting piece with the angle of its slot initially nearer to or farther from the roller, the valve can be reversed when it has been opened to any desired extent, thereby enabling the supply of steam to be regulated properly to insure a desired reduction in speed of the engine to prevent an increase in the air pressure. The connecting piece preferably has the cam slot in which the roller $d'$ works, but as it is held against the roller at all times by the steam pressure on the valve, it would operate in the same manner if it only had a cam end shaped like the lower edge of the slot.

The mechanism shown for opposing the movement of the governor piston is constructed as follows: H H represent springs arranged on opposite sides of the motor cylinder C and connected at their lower ends to arms $h$ projecting from the lower end of the cylinder, and at their upper ends to a yoke $h'$ provided at its middle with projections bearing on a nut $h^2$ which is adjustable on a screw-threaded part of the piston rod. The lower ends of the springs are preferably adjustably connected to the arms $h$ by nuts $h^3$ screwed on the threaded lower ends of the springs. By means of these adjustable connections the initial position of the motor piston and valve can be changed with or without varying the tension of the springs H. In the initial position the valve should be open just enough, as shown in Fig. 1, for driving the engine at the desired speed when not doing any work. I, Fig. 4, represents internally threaded sleeves screwed on the springs H for regulating the extensibility thereof. By screwing these sleeves farther onto or off of the springs, the operative length thereof will be decreased or increased accordingly, so as to secure a shorter or longer movement of the governor piston and valve under a given air pressure and spring resistance on the piston.

K, Figs. 1, 2, and 3, represents a normal speed stop which is pivoted on the upper end of the governor cylinder and has a hooked end adapted to be swung under an adjustable nut $k$ on the piston rod to limit the downward movement of the piston to prevent the closing of the valve beyond the normal position shown in Fig. 1. The stop can be swung out, as shown in Fig. 2, to allow the piston to descend farther and more nearly close the valve. Any other suitable stop could be used for this purpose.

The operation of the governor is as follows: In the starting of the engine, the normal speed stop K occupies the position shown in Fig. 1, beneath the stop nut $k$, and the nut is adjusted to give the proper valve opening to produce the desired normal speed of the engine. The connecting piece F occupies the position shown in Fig. 1 with the roller $d'$ in the inner end of the curved part of the cam slot $f$. As the air pressure increases the governor piston will rise and through the connecting mechanism open the valve wider so that the speed of the engine will be uniform notwithstanding the increasing air pressure and load. The upward movement of the governor piston will also swing the connecting piece F inwardly, as explained. When the desired air pressure is attained, the link G is adjusted to place the angle of the slot in the connecting piece beneath the roller $d'$, as shown in Fig. 2. If the pressure continues to rise and lift the governor piston, the roller will descend in the inclined portion of the cam slot and the valve will be reversed and moved toward its seat, as explained, thus reducing the speed of the engine to such an extent as to hold the air pressure at the desired maximum. After the compressor is started and the stop nut $k$ lifted off of the normal speed stop K, the latter is swung from beneath the nut, as shown in Fig. 2, and if the governor is used on a single compressor fitted with an unloader, the governor motor will receive its pressure through the unloader, which, when it goes into action, will allow the escape of pressure from beneath the governor piston as usual, thus permitting the latter to descend and the valve to close until arrested by the stop $e$. This stop is adjusted to permit the valve to nearly but not completely close, so that it will supply just steam enough to keep the engine in motion. Before stopping the engine the normal speed stop K is again swung into position beneath the coöperating nut $k$, so that when next starting up the engine, it will run at the desired normal speed.

The fulcrum post $d$ upon which the governor and valve levers are fulcrumed could be rigidly mounted and the governor would operate as described, but the post is preferably provided with a piston L movable vertically in a cylinder $l$ on the valve casing to which the steam pressure is admitted beneath the piston from the valve casing B by a suitable passage $l'$. The steam pressure on the piston is opposed by suitable means, such as a spring $l^2$ surrounding the post between the piston and a screw cap $l^3$ on the cylinder $l$ by which the pressure of the spring can be regulated. The spring is adjusted to hold the fulcrum post in an intermediate position under a normal steam pressure. Should the steam pressure rise above or fall below the normal, the fulcrum post and the mechanism carried thereby will be raised or lowered accordingly, so that the valve will be moved toward or from its seat to prevent the fluctuation in the steam pressure from changing the speed of the engine. The steam-operated fulcrum post operates in conjunction with the air-operated governor piston. It can be used or not, as desired.

The governor is preferably constructed as above described, but the connecting mechanism between the governor motor and the steam valve could be of other construction and operate in a similar manner, as illustrated, for example, in Fig. 6. In this construction B' represents the valve casing, C' the governor motor, D' the lever connected to the motor piston, E' the lever connected to the valve, and F' the connecting piece. The latter is pivoted to the valve lever, bears on a cam-faced nut $f^3$ adjustable on a screw-threaded portion of the governor lever D', and is connected by a link $f^4$ to an arm of the governor lever. The nut has a face curved concentrically with the pivot of the connecting piece F', and a face at an angle of about 45° therewith. The action of this connecting piece is similar to the other. It will be moved over the cam nut by the movement of the governor lever and will open the valve as long as it bears on the curved face of the nut, but will allow the valve to close when it rides down the inclined face of the nut. The nut can be adjusted relative to the connecting piece to regulate the opening of the valve. A spring $m$ is preferably, though not necessarily, employed for holding the connecting piece against the cam-faced nut.

I claim as my invention:

1. In a pressure governor, the combination of a valve, a part operated by fluid pressure, mechanism connecting said fluid-operated part and said valve and including a device which is shifted in position by the movement of said fluid-operated part and by its position causes said valve to move with or in opposition to said fluid-operated part, and means for adjusting the position of said device relative to said fluid-operated part, substantially as set forth.

2. In a pressure governor, the combination of a valve, a motor operated by fluid pressure, levers connected to said motor and to said valve, and a connecting device between said levers which is shifted by said motor and by its position causes said valve to move with or in opposition to said lever connected to the motor, substantially as set forth.

3. In a pressure governor, the combination of a valve, a motor having a part moved in one direction by fluid pressure, levers connected to said movable part of the motor and to said valve, and a connecting device between said levers including a cam connected to one lever and a part connected to the other lever and bearing on said cam and connected with said movable part of the motor for changing the relation of said cam and bearing part of the connecting device, whereby said valve is moved first in one direction and then in the opposite direction by the movement of said motor part in one direction, substantially as set forth.

4. In a pressure governor, the combination of a valve, a motor operated by fluid pressure, levers connected to said motor and to said valve, a connecting device between said levers consisting of a cam connected to one lever and a part connected to the other lever and bearing on said cam, a connection between one part of said connecting device and the lever connected to said motor for moving said part, and means for adjusting said cam relative to the part bearing thereon, substantially as set forth.

5. In a pressure governor, the combination of a valve, a motor operated by fluid pressure, connecting mechanism between said motor and valve for moving said valve first in one direction and then allowing said valve to be moved by the pressure thereon in the opposite direction during the movement in one direction of the movable part of said motor, and means for adjusting said connections to vary the movement of the valve relative to the motor, substantially as set forth.

6. In a pressure governor, the combination of a valve, a motor operated by fluid pressure, connecting mechanism between said motor and valve for moving said valve first in one direction and then allowing said valve to be moved by the pressure thereon in the opposite direction during the movement in one direction of the movable part of said motor, means for resisting the movement of said movable part of the motor by said fluid pressure, and means for varying the travel of said movable part of the motor under a given pressure of the fluid and opposing pressure of said resisting means, substantially as set forth.

7. In a pressure governor, the combination of a valve, a motor operated by fluid pressure, connecting mechanism between said motor and valve for opening and closing said valve, a stop which normally limits the closing movement of said valve and which is adapted to be rendered inactive, and a second stop which is inactive when said first stop is in operative position and is brought into action to limit the closing movement of said valve by placing said first stop out of action, substantially as set forth.

8. In a pressure governor for pumping engines, the combination of a valve controlling the supply of motive fluid to the engine, a motor operated by the pumped fluid, levers connected to said motor and to said valve, and a connecting device between said levers which is shifted by said motor and by its position causes said valve to move with or in opposition to said lever connected to the motor, substantially as set forth.

9. In a pressure governor, the combination of a valve, a motor operated by fluid pressure, connecting mechanism between said motor and valve for opening said valve and then allowing it to close during movement of said motor in one direction, a support for said connecting mechanism, and means whereby fluctuations in the pressure of the fluid controlled by said valve changes the position of said support, substantially as set forth.

10. In a pressure governor, the combination of a valve, a motor operated by fluid pressure, connecting mechanism between said motor and valve for opening and closing said valve, a support for said connecting mechanism, and means whereby fluctuations in the pressure of the fluid controlled by said valve change the position of said support to alter the position of said valve in accordance with such fluctuations of pressure, substantially as set forth.

11. In a pressure governor, the combination of a valve, a motor operated by fluid pressure, lever mechanism connecting said motor to said valve, a fulcrum post for said lever mechanism, and means whereby fluctuations in the pressure controlled by said valve change the position of said fulcrum post to alter the position of said valve, substantially as set forth.

12. The combination with a valve casing and a controlling valve mounted therein, of a pressure chamber comprising a movable wall, means for yieldingly urging said movable wall against the action of pressure within the pressure chamber, intermediate connections between the valve and the movable wall for opening and closing the valve by opposite movements of the movable wall, and means connected with said intermediate connections for producing a closing movement of the valve by an excessive movement of the pressure chamber wall in the valve opening direction.

13. The combination with a valve casing and a controlling valve mounted therein, of a pressure chamber comprising a movable wall, means for yieldingly urging said movable wall against the action of pressure within the pressure chamber, intermediate connections between the valve and the movable wall for opening and closing the valve by opposite movements of the movable wall, and means for producing a closing movement of the valve by an excessive movement of the pressure chamber wall in the valve opening direction.

14. The combination with a valve casing and a controlling valve mounted therein, of an operating member engaging the valve to open and close the same, a pressure chamber having a movable wall, means for normally urging said movable wall in a direction opposite to the force within the pressure chamber, a connection between the valve operating member and the movable wall to open and close the valve by opposite movements of the movable wall, a secondary connection between the valve operating member and the movable wall, and means coöperating with said secondary connection upon an excessive movement of the movable wall in the valve opening direction to reverse the effect of said movable wall upon the valve operating member.

15. In a pressure governor for pumping engines, the combination of a valve controlling the supply of motive fluid to the engine, a pressure chamber communicating with the discharge of the pump operated by the engine and having a movable wall, yielding resistance means acting upon said movable wall in opposition to the pressure within said chamber, and mechanical connections between said movable wall and said valve through which opposite movements of said wall within a predetermined range respectively open and close said valve and through which beyond such range the same movements respectively close and open said valve.

Witness my hand, this 9th day of December, 1907.

GEORGE M. RICHARDS.

Witnesses:
F. P. COYLE,
GEO. M. LYLE.